P. LACKNER.
UNIVERSAL MICROMETER.
APPLICATION FILED SEPT. 15, 1916.
1,226,337.
Patented May 15, 1917.
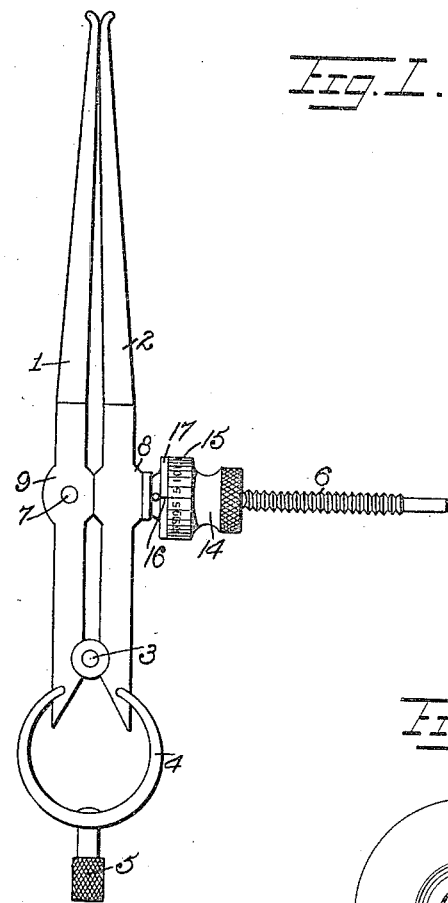
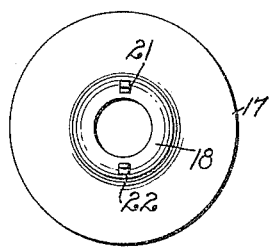
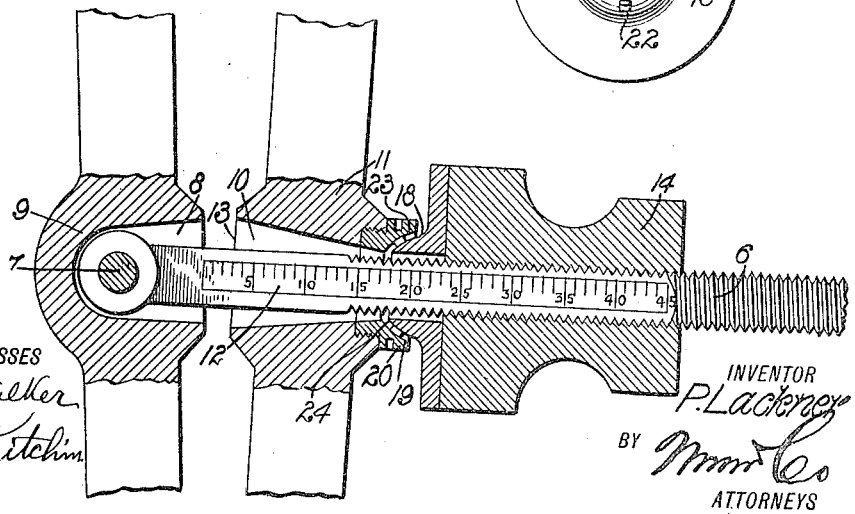
WITNESSES
H. T. Walker
A. L. Kitchin
INVENTOR
P. Lackner
BY
ATTORNEYS

UNITED STATES PATENT OFFICE.

PETER LACKNER, OF NEW BRUNSWICK, NEW JERSEY.

UNIVERSAL MICROMETER.

1,226,337.  Specification of Letters Patent.  Patented May 15, 1917.

Application filed September 15, 1916. Serial No. 120,235.

*To all whom it may concern:*

Be it known that I, PETER LACKNER, a citizen of the United States, and a resident of New Brunswick, in the county of Middlesex and State of New Jersey, have invented a new and Improved Universal Micrometer, of which the following is a full, clear, and exact description.

This invention relates to measuring instruments and particularly to a micrometer which is in the nature of a caliper, and has for an object the provision of an improved arrangement whereby any distance within wide limits may be accurately measured.

Another object in view is to provide what may be termed a universal micrometer by reason of the fact that means are produced which may be quickly moved for measuring long distances and then moved for measuring a very short distance.

A still further object in view is to provide an instrument on the general type of a caliper but arranged with a set of scales on the adjusting nut and a scale on the adjusting screw which coacts with the scales on the nut.

In the accompanying drawing:—

Figure 1 is a side view of a micrometer disclosing an embodiment of the invention.
Fig. 2 is an enlarged fragmentary sectional view through the operating parts of the micrometer shown in Fig. 1.

Fig. 3 is a plan view of the washer interposed between the nut and legs of the calipers.

Referring to the accompanying drawing by numerals, 1 and 2 indicate the legs of a pair of calipers, that shown being known as an inside caliper, though it will be evident that by turning the ends the caliper could be used as an outside instrument or if the points were straight it could be used as dividers. The legs 1 and 2 are pivotally connected together at 3 by the ordinary hinge connection now commonly in use. A spring 4 is used for separating the legs 1 and 2, this spring being provided with a hand operated member 5, members 3, 4 and 5 being old and well known structures but used in connection with the legs 1 and 2 and other parts of the structure shown in Fig. 1.

As shown in Fig. 2, a threaded adjusting rod or screw 6 is pivotally mounted at 7 in a socket 8 formed in the enlargement 9 of leg 1 and passes through a socket 10 formed in the enlargement 11 of leg 2. The rod 6 is provided with a scale 12 which may have any suitable graduations thereon, that shown being designed to have each numbered section indicate a movement of one-half inch at the end of the calipers. For instance, when the calipers are opened until the line 13 is registering with a line indicated by the numeral 5 on the scale, the ends of the legs 1 and 2 are one-half inch apart, and when the line marked 10 on the scale 12 is registering with line 13 the points of the calipers are one inch apart, and so on for the extreme opening movement of the calipers. It is of course evident that other graduations could be made on scale 12 without departing from the spirit of the invention.

Arranged on the threaded bar 6 is a nut 14 provided with a scale having graduations 15 thereon designed to coact with the zero mark 16 on the washer 17. The zero mark 16 is shown as being a single line but it is evident that a vernier scale could be substituted without departing from the spirit of the invention. The scale 15 is indicated as being one-hundredths, but it is evident that other scales or graduations could be produced without departing from the spirit of the invention.

The washer 17 is provided with a projecting member 18 having a rounded lower surface fitting into a socket 19 in the sleeve 20, which sleeve is threaded into the enlargement 11. This structure is desirable in that it allows an automatic positioning of the rod 6 and also allows the workman to take up any wear on the washer 17 or the nut 14, or, in fact, any of the parts, thus correcting any inaccuracies in the instrument after the same has been used for some time. If, for instance, the washer 17 should become worn the instrument would be slightly inaccurate and in order to correct this the sleeve 20 would be rotated or unscrewed to a slight extent until the inaccuracy has been compensated. The rounded lower surface is substantially semi-globular in order to properly adjust itself to the different angles at which the screw 6 is positioned. However, in order to prevent the rotation of this washer lugs 21 and 22 are provided operated in arc-shaped grooves 23 and 24, respectively, whereby a free rocking movement is permitted but the washer cannot rotate with the nut 14. Referring again to the scales shown on the drawing, it is to be noted that these shown are merely for the purpose of illustration and present a practical desirable structure, but other scales and graduations could be substituted without changing the principle of the invention.

What I claim is:

1. In a measuring instrument of the character described, a pair of separable legs, each of said legs being formed with an enlargement intermediate its ends, each leg being provided with a socket, one of said sockets extending entirely through the leg on which it is arranged, a threaded bar extending through said last mentioned socket into the socket in the other leg, a pivotal member connecting said bar with said last mentioned leg, a rounded member for transmitting strain from said bar to one of said legs, and a nut on said threaded bar acting on said rounded member for limiting the opening movement of said legs.

2. In a micrometer of the character described, a caliper construction including legs and a threaded shaft, a scale arranged on said shaft for indicating the amount of opening of the calipers, a nut on said shaft for limiting the opening of the legs of the caliper, said nut being formed with graduations thereon for indicating the amount of turning of the nut so as to determine small fractional changes of distances between the points of the calipers, and means interposed between said nut and the legs coacting with the graduations on the nut for indicating the amount of turning of the nut.

3. A micrometer of the character described, comprising a caliper construction including legs and the usual threaded bar and nut, a washer arranged between the legs of the caliper and said nut, and a threaded sleeve fitting into one of the legs of said caliper and engaging said washer whereby upon unscrewing the sleeve to a predetermined extent wear on the parts of the micrometer may be taken up in order to maintain the micrometer accurate.

4. In a micrometer of the character described, a caliper construction including legs and a threaded tension bar and a nut, a washer surrounding said bar and engaged by said nut, said washer having an enlargement formed with a rounded end, and a sleeve threaded into one of said legs, said sleeve being formed with a socket fitting the enlargement on said washer whereby the parts automatically assume a correct position and by an adjustment of the sleeve the wear on the parts may be compensated.

PETER LACKNER.

Witnesses:
T. H. KINKADE,
O. BODINSON.

Copies of this patent may be obtained for five cents each, by addressing the "Commissioner of Patents. Washington, D. C."